United States Patent
Fishel et al.

(10) Patent No.: US 11,867,574 B1
(45) Date of Patent: Jan. 9, 2024

(54) FLUIDIC TACTILE SENSOR

(71) Applicant: Sanctuary Cognitive Systems (USA) Corporation, Wilmington, DE (US)

(72) Inventors: Jeremy Fishel, Chico, CA (US); William Cortez, Chico, CA (US); Jacob Grout, Clovis, CA (US)

(73) Assignee: Sanctuary Cognitive Systems Corporation, Vancouver (CA)

( * ) Notice: Subject to any disclaimer, the term of this patent is extended or adjusted under 35 U.S.C. 154(b) by 0 days.

(21) Appl. No.: 18/219,392

(22) Filed: Jul. 7, 2023

Related U.S. Application Data (60) Provisional application No. 63/468,460, filed on May 23, 2023.

(51) Int. Cl.
*G01L 1/00* (2006.01)
*G01L 1/02* (2006.01)
*B25J 13/08* (2006.01)

(52) U.S. Cl.
CPC .............. *G01L 1/02* (2013.01); *B25J 13/084* (2013.01)

(58) Field of Classification Search
CPC .................................. G01L 1/02; B25J 13/084
USPC ..................................................... 73/862.581
See application file for complete search history.

(56) References Cited

U.S. PATENT DOCUMENTS

| | | | | |
|---|---|---|---|---|
| 3,744,303 A * | 7/1973 | Drzewiecki | ............. | G01B 5/30 137/830 |
| 4,008,601 A * | 2/1977 | Woods | .................. | G01N 7/00 73/31.04 |
| 4,100,789 A * | 7/1978 | Joyce | .................. | G01N 7/00 73/31.04 |
| 4,326,559 A * | 4/1982 | Drzewiecki | ............. | G01P 15/03 73/514.12 |
| 7,543,504 B1 * | 6/2009 | Cheng | ...................... | G01B 7/18 73/777 |
| 8,181,540 B2 | 5/2012 | Loeb et al. | | |
| 9,080,918 B2 | 7/2015 | Fishel et al. | | |
| 2010/0294041 A1 * | 11/2010 | Tai | .................. | A61B 5/0215 73/718 |
| 2019/0235671 A1 * | 8/2019 | Lazzi | ................. | H03K 19/1733 |
| 2022/0381634 A1 * | 12/2022 | Monichino | ............. | G01L 9/007 |

OTHER PUBLICATIONS

Liang He, Qiujie Lu, Sara-Adela Abad, Nicolas Rojas, and Thrishanthan Nanayakkara, "Soft Fingertips with Tactile Sensing and Active Deformation for Robust Grasping of Delicate Objects", IEEE Robotics and Automation Letters, vol. 6, No. 2, Apr. 2020.

* cited by examiner

*Primary Examiner* — Max H Noori
*Assistant Examiner* — Masoud H Noori
(74) *Attorney, Agent, or Firm* — Adenike Adebiyi; Thomas Mahon (57) ABSTRACT

A fluidic tactile sensor includes a core having an outer core portion, an inner core portion, and a first channel having a first opening at a first surface portion of the outer core portion. An elastic skin is disposed over the first surface portion. A cell is formed between the first surface portion and the elastic skin and fluidly is fluidly connected to the first channel. The cell contains a fluid. A contact force applied to the elastic skin produces a measurable change in fluid pressure inside the cell.

18 Claims, 13 Drawing Sheets

FLUIDIC TACTILE SENSOR

CROSS-REFERENCE TO RELATED APPLICATIONS

This application claims the benefit of U.S. Provisional Application No. 63/468,460 filed May 23, 2023, the disclosure of which is incorporated herein by reference.

FIELD

The field generally relates to robotics and particularly to tactile sensing in robotics.

BACKGROUND

Robots are machines that can sense their environments and perform tasks autonomously or semi-autonomously. A humanoid robot is a robot or machine having an appearance and/or character resembling that of a human. Humanoid robots can be designed to function as team members with humans in diverse applications, such as construction, manufacturing, monitoring, exploration, learning, and entertainment. Humanoid robots can be particularly advantageous in substituting for humans in environments that may be dangerous to humans or uninhabitable by humans.

SUMMARY

Disclosed herein is a fluidic tactile sensor that can be attached to a surface of an object to provide the object with tactile sensing at the surface. The fluidic tactile sensor can be adapted for attachment to any portion of an external surface of a robot, providing the robot with the ability to be sensitive to contacts and collisions.

In a representative example, a fluidic tactile sensor includes a core comprising an outer core portion, an inner core portion, and a first channel having a first opening at a first surface portion of the outer core portion. An elastic skin is disposed over the first surface portion. A cell is formed between the first surface portion and the elastic skin and fluidly connected to the first channel. The cell contains a fluid. A contact force applied to the elastic skin produces a measurable change in fluid pressure inside the cell.

In another representative example, a fluidic tactile sensor includes a core comprising an outer core portion, an inner core portion, and a plurality of first channels having first openings at a plurality of first surface portions of the outer core portion. An elastic skin is disposed over the first surface portions. A plurality of cells is formed between the first surface portions and the elastic skin and fluidly connected to the plurality of first channels. Each of the cells contains a fluid. A contact force applied to the elastic skin at a first location corresponding to one of the cells produces a measurable change in fluid pressure inside the one of the cells.

DETAILED DESCRIPTION

General Considerations

For the purpose of this description, certain specific details are set forth herein in order to provide a thorough understanding of disclosed technology. In some cases, as will be recognized by one skilled in the art, the disclosed technology may be practiced without one or more of these specific details, or may be practiced with other methods, structures, and materials not specifically disclosed herein. In some instances, well-known structures and/or processes associated with robots have been omitted to avoid obscuring novel and non-obvious aspects of the disclosed technology.

All the examples of the disclosed technology described herein and shown in the drawings may be combined without any restrictions to form any number of combinations, unless the context clearly dictates otherwise, such as if the proposed combination involves elements that are incompatible or mutually exclusive. The sequential order of the acts in any process described herein may be rearranged, unless the context clearly dictates otherwise, such as if one act or operation requests the result of another act or operation as input.

In the interest of conciseness, and for the sake of continuity in the description, same or similar reference characters may be used for same or similar elements in different figures, and description of an element in one figure will be deemed to carry over when the element appears in other figures with the same or similar reference character, unless stated otherwise. In some cases, the term "corresponding to" may be used to describe correspondence between elements of different figures. In an example usage, when an element in a first figure is described as corresponding to another element in a second figure, the element in the first figure is deemed to have the characteristics of the other element in the second figure, and vice versa, unless stated otherwise.

The word "comprise" and derivatives thereof, such as "comprises" and "comprising", are to be construed in an open, inclusive sense, that is, as "including, but not limited to". The singular forms "a", "an", "at least one", and "the" include plural referents, unless the context dictates otherwise. The term "and/or", when used between the last two elements of a list of elements, means any one or more of the listed elements. The term "or" is generally employed in its broadest sense, that is, as meaning "and/or", unless the context clearly dictates otherwise. When used to describe a range of dimensions, the phrase "between X and Y" represents a range that includes X and Y. As used herein, an "apparatus" may refer to any individual device, collection of devices, part of a device, or collections of parts of devices.

The term "coupled" without a qualifier generally means physically coupled or lined and does not exclude the presence of intermediate elements between the coupled elements absent specific contrary language. The term "plurality" or "plural" when used together with an element means two or more of the element. Directions and other relative references (e.g., inner and outer, upper and lower, above and below, and left and right) may be used to facilitate discussion of the drawings and principles but are not intended to be limiting.

The headings and Abstract are provided for convenience only and are not intended, and should not be construed, to interpret the scope or meaning of the disclosed technology.

Example I—Overview

There is a need for technologies that can enable a humanoid robot to perform human-like work (e.g., work involving high dexterity) at human-like speeds.

Described herein is a fluidic tactile sensor that can be attached to a surface of interest to enable tactile sensing. The fluidic tactile sensor can detect contact robustly and compliantly with high sensitivity and high signal-to-noise ratio based on changes in fluid pressure inside the sensor. The fluidic tactile sensor can be adapted for attachment to any portion of an external surface of a robot, providing the robot with the ability to be sensitive to contacts and collisions, which can ultimately result in the robot performing tasks quickly and safely.

Example II—Fluidic Tactile Sensor

FIGS. 1-4 illustrate an exemplary fluidic tactile sensor 100 that can be attached to a surface of interest to enable tactile sensing. In some examples, the surface of interest can be any external surface of a robot where tactile sensing is desired (e.g., any external surface of a robotic hand). In the illustrated example, the fluidic tactile sensor 100 is shaped for attachment to a distal phalanx of a robotic digit (see FIGS. 8-10 and Example III). However, the fluidic tactile sensor 100 is not limited to this application and can be suitably shaped to conform to other external surfaces of a robot.

Figure 1:
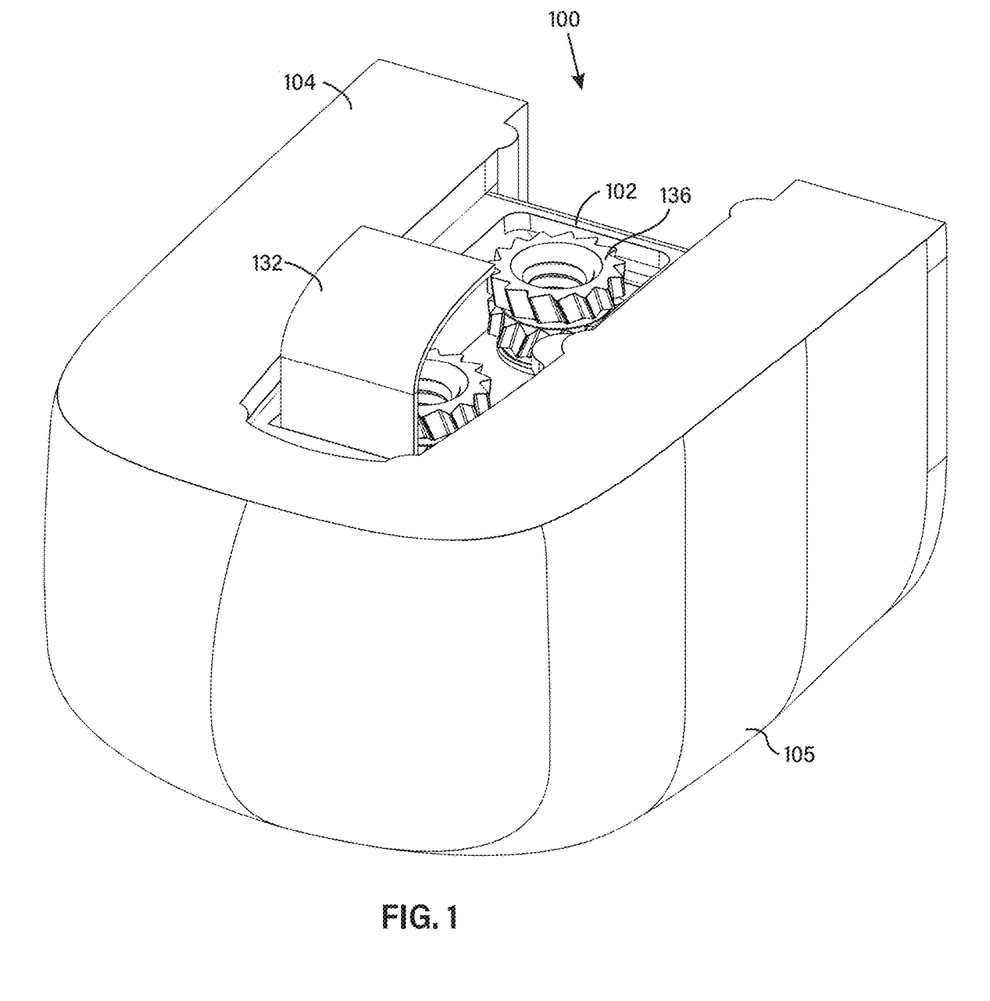
FIG. 1 is a perspective view of a fluidic tactile sensor.
Figure 2A:
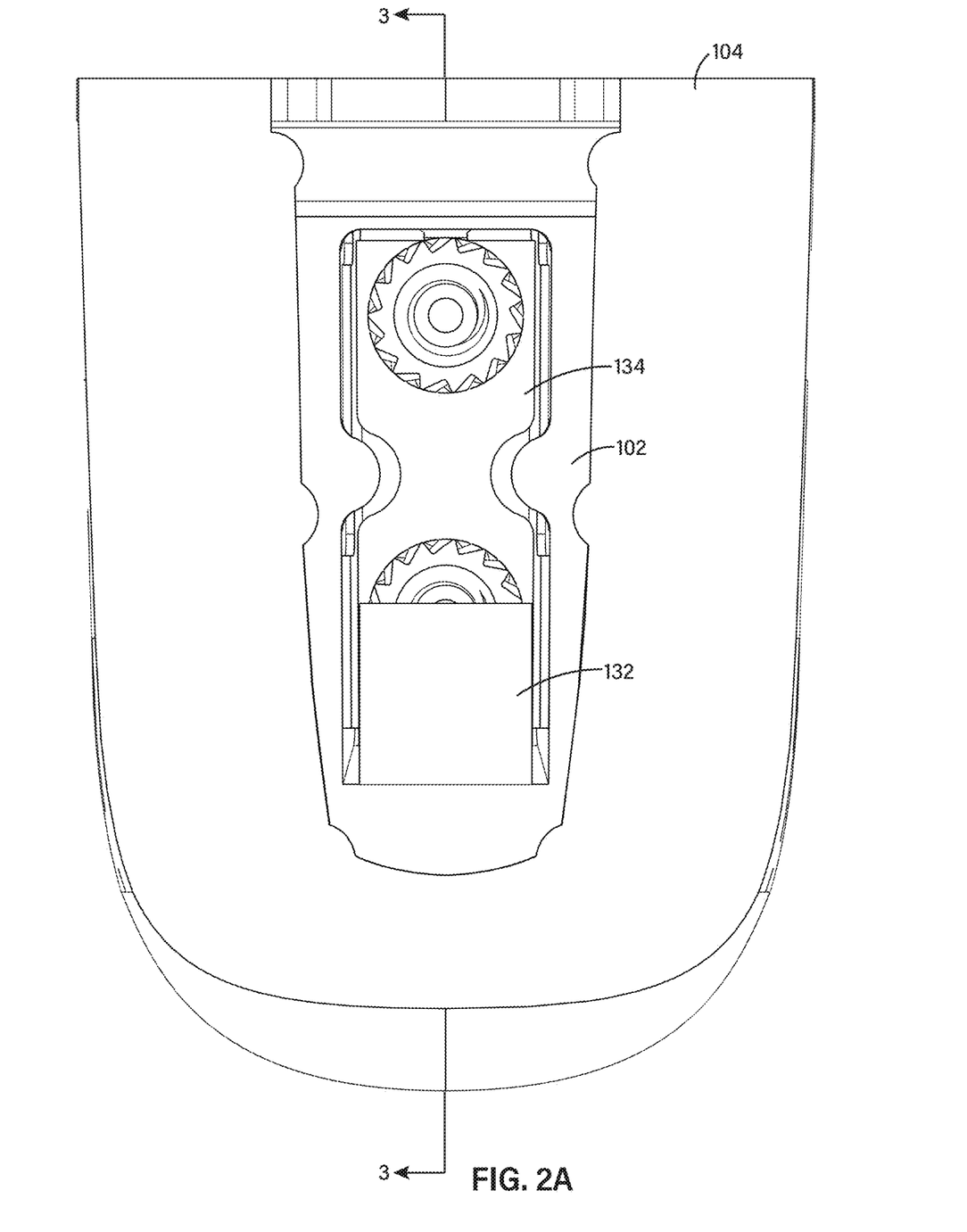
FIG. 2A is a top view of the fluidic tactile sensor shown in FIG. 1.
Figure 2B:
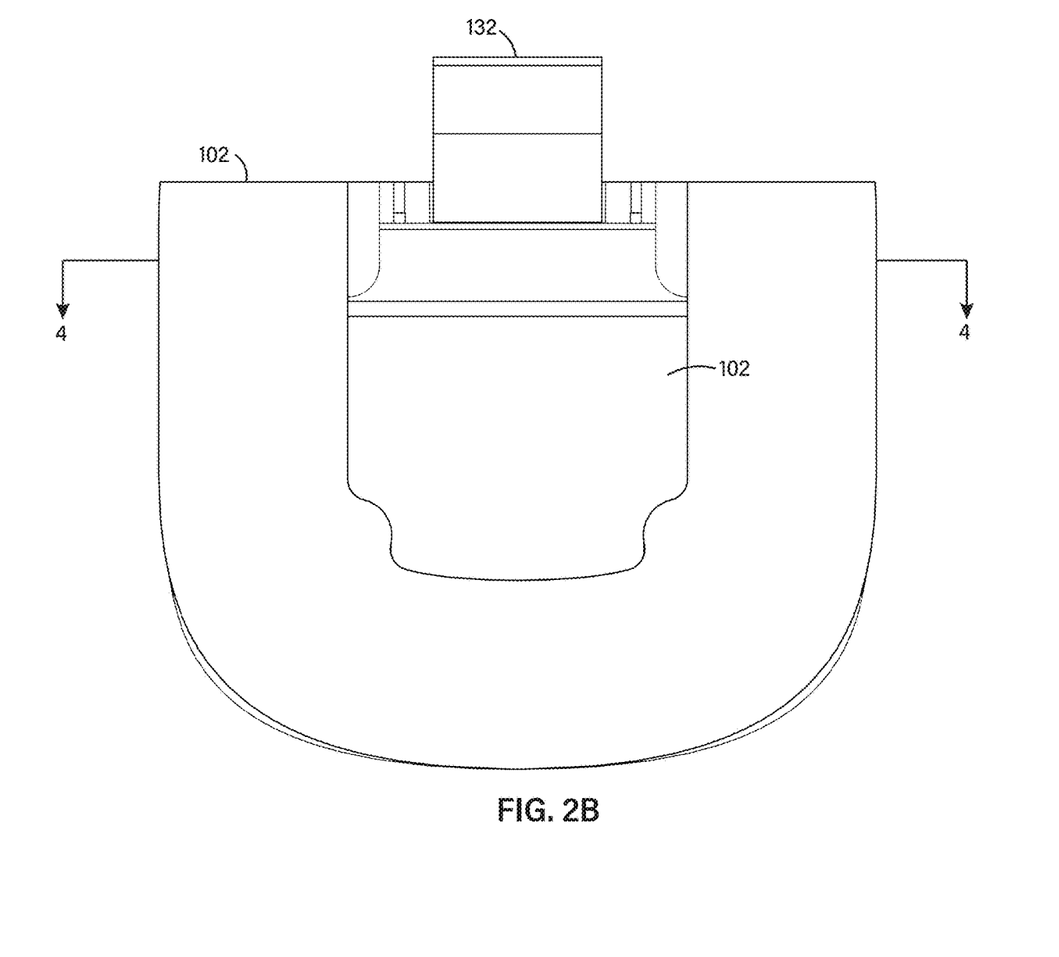
FIG. 2B is a rear view of the fluidic tactile sensor shown in FIG. 1.
Figure 3:
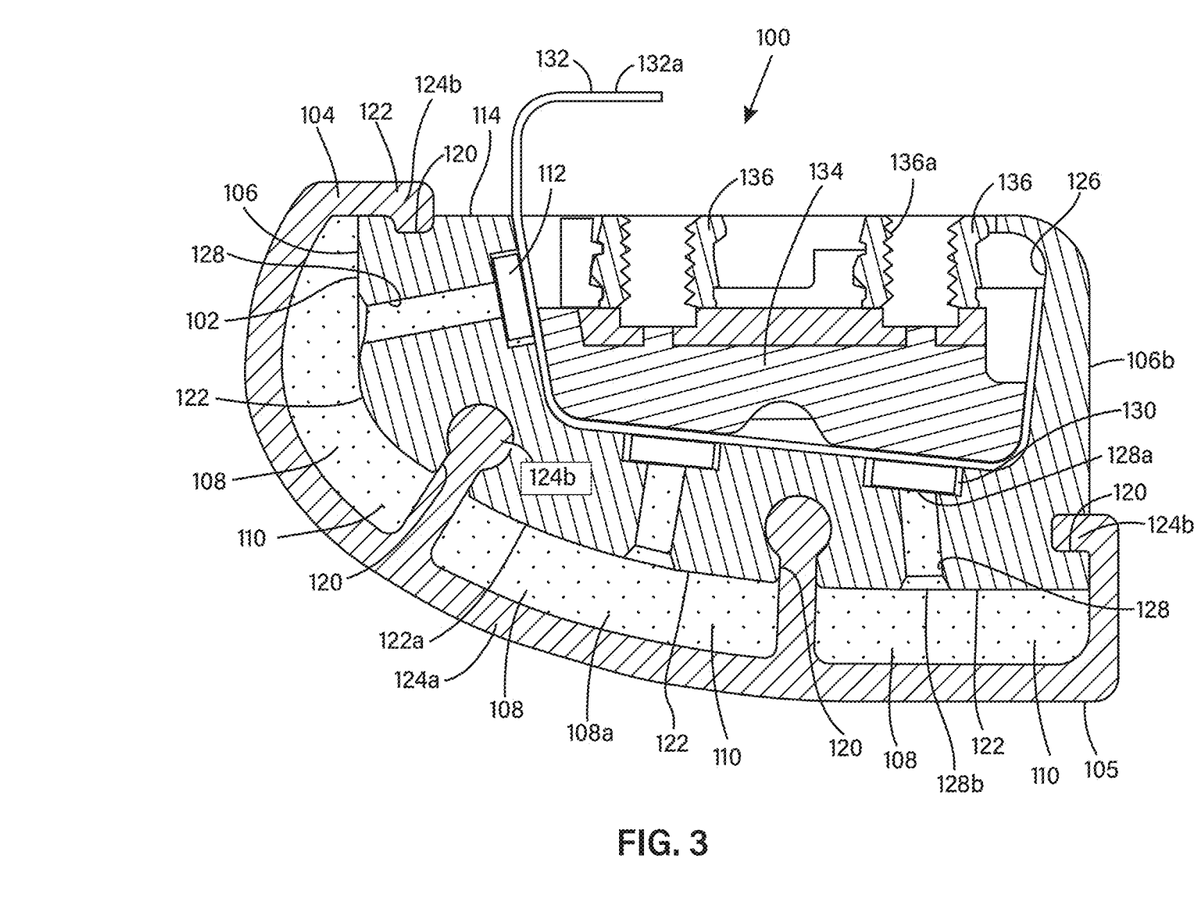
FIG. 3 is a cross-sectional view of the fluidic tactile sensor shown in FIG. 1 taken along line 3-3 as shown in FIG. 2A.

In some examples, as shown more clearly in FIG. 3, the fluidic tactile sensor 100 can include a core 102, an elastic skin 104 disposed around an outer core portion 106 of the core 102, and one or more cells 108 formed between the outer core portion 106 of the core 102 and the elastic skin 104. The cell 108 can contain a fluid 110. In some examples, the fluid 110 in the cells 108 can be a gas (e.g., ambient air or other inert gas) or a liquid. In some examples, the liquid can have lubricative properties to reduce hysteresis (e.g., silicone oil). In other examples, the fluid 110 can be a biphasic fluid (e.g., a gel-like fluid).

The fluidic tactile sensor 100 can include one or more pressure transducers 112 arranged to sense fluid pressure changes inside the cells 108. In some examples, each cell 108 can have an associated pressure transducer 112. When a contact force is applied to the elastic skin 104 (e.g., by touching or colliding with the elastic skin 104), the elastic skin 104 can deform to cause a change in fluid pressure inside one or more of the cells 108. The location of the contact force on the elastic skin 104 and the magnitude of the contact force can be deduced from the outputs of the pressure transducers 112.

In some examples, the fluid 110 in the cells 108 can be compressed to a desired stiffness or reference pressure. In some examples, fluid compression can allow detection of possible damage to the fluidic tactile sensor 100 from the outputs of the pressure transducers 112. For example, an output of a pressure transducer 112 that shows a cell pressure below a reference pressure can indicate damage to the cell. In some examples, when the fluidic tactile sensor 100 is used on a robot, the robot can detect when the sensor might be faulty based on the outputs of the pressure transducers 112 and raise a service alert.

The elastic skin 104 can be formed from an elastomer or other resilient material. The fluid 110 and the material of the elastic skin 104 can be selected such that the elastic skin 104 is substantially impermeable to the fluid 110. In some examples, an external surface 105 of the elastic skin 104 can include textures (such as ridges) to facilitate gripping of surfaces with the elastic skin (e.g., if the fluidic tactile sensor 100 is used on a robotic digit).

In some examples, the core 102 can be a relatively rigid core such that the elastic skin 104 can be deformed without deforming the core 102. For example, the core 102 can be formed from hard plastic or metal. In examples where the core 102 is relatively rigid, tactile sensing can be primarily a function of the fluid pressure inside the cells 108. In other examples, the core 102 can be semi-rigid such that for a range of forces the core 102 can experience some deformation when the elastic skin 104 is deformed. In this case, tactile sensing can be a function of both the fluid pressure inside the cells 108 and the stiffness of the core 102 for the range of forces.

Figure 5:
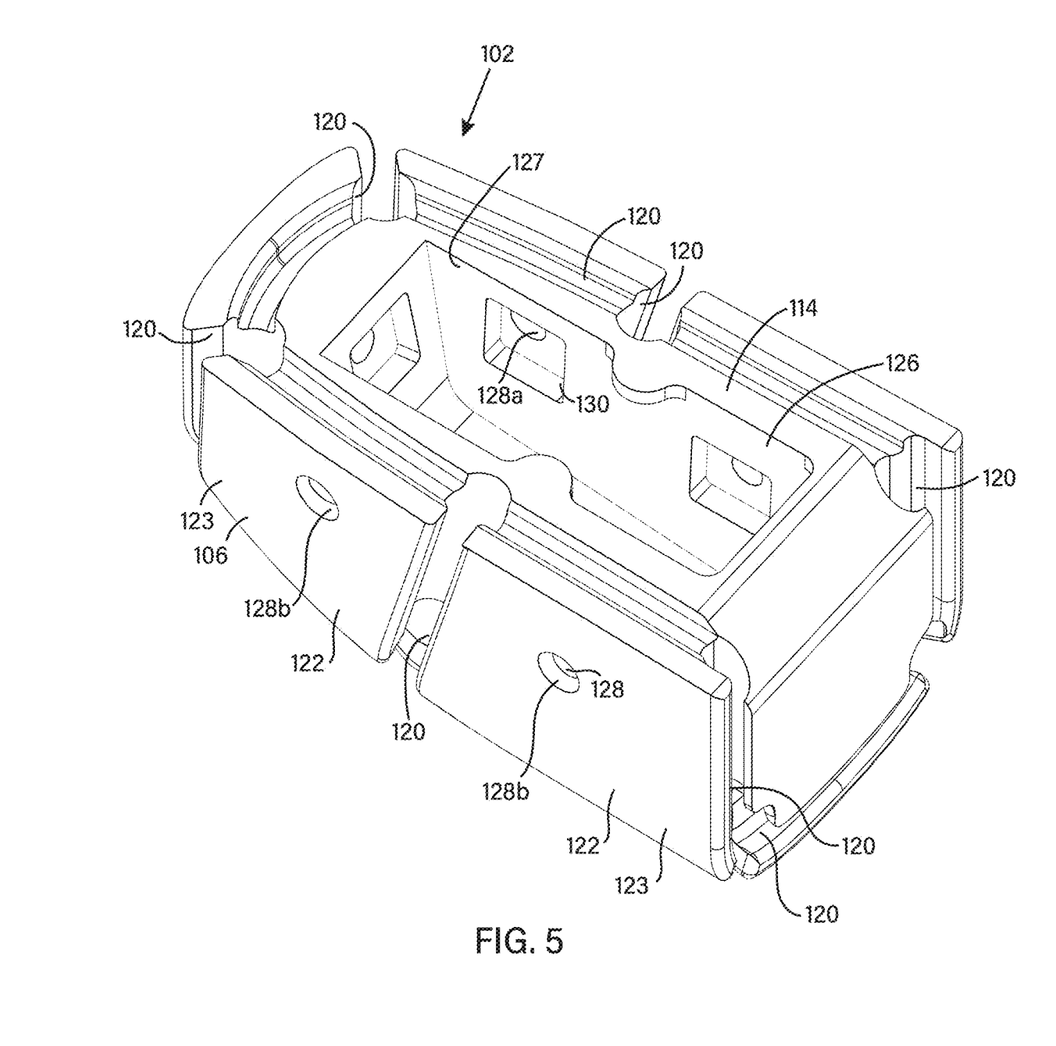
FIG. 5 is a perspective view of a core of the fluidic tactile sensor shown in FIG. 1.

In some examples, as shown more clearly in FIG. 5, the core 102 can include an inner core portion 114 nested within the outer core portion 106. In the example, the outer core portion 106 has a curved shape such that the core 102 has an overall nonplanar geometry (e.g., a cross-section of the core 102 can have a U-shape). In other examples, the core 102 can have a planar geometry (e.g., the outer core portion 106 and the inner core portion 114 can be planar and arranged in a stack).

Figure 4:
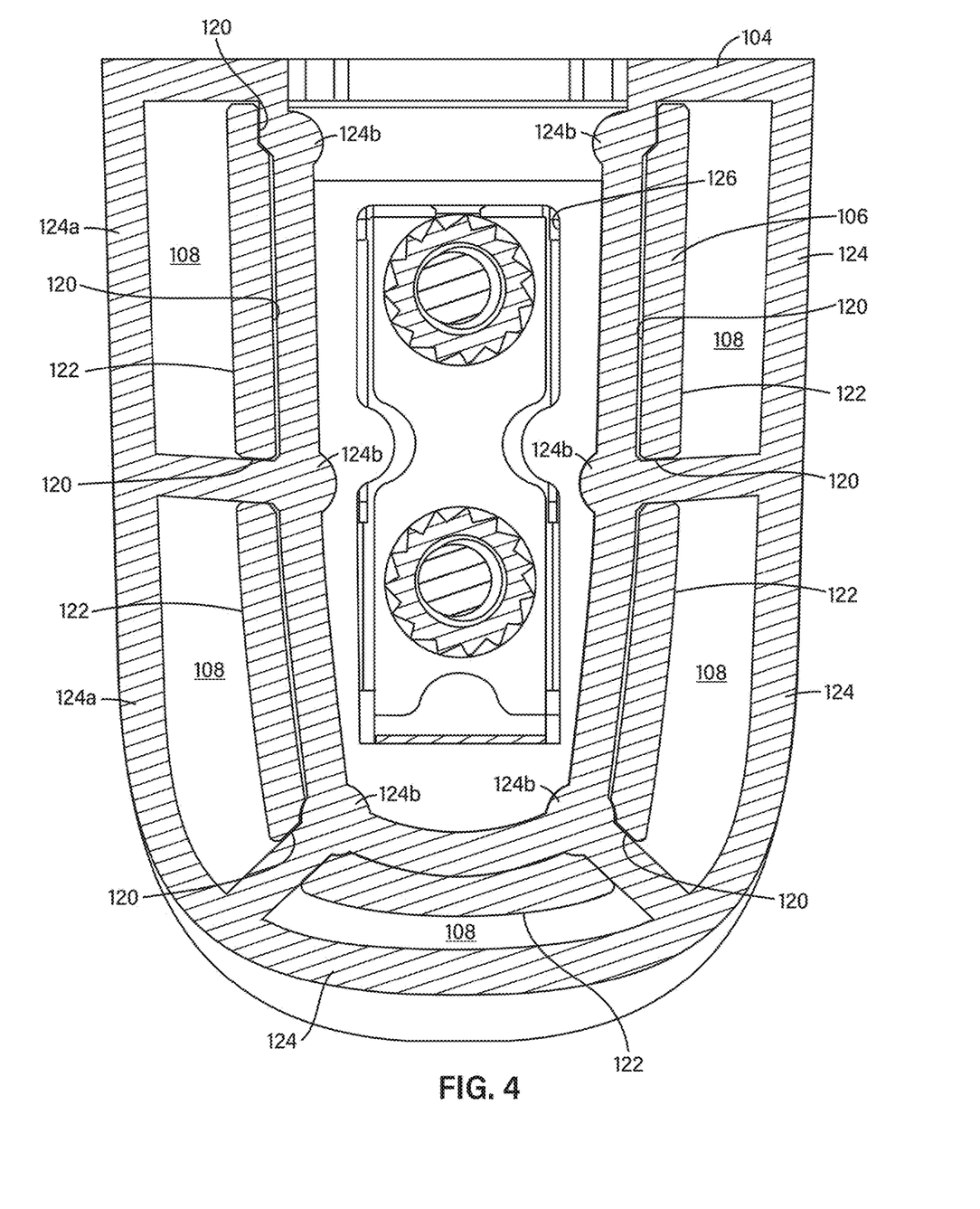
FIG. 4 is a cross-sectional view of the fluidic tactile sensor shown in FIG. 1 taken along line 4-4 as shown in FIG. 2B.

The core 102 includes a network of interconnected channels 120 formed in the outer core portion 106. The channels 120 can have an undercut profile (e.g., a dovetail profile). Portions 104a of the elastic skin 104 extend into and engage the channels 120, as shown in FIGS. 3 and 4, forming isolated enclosed volumes corresponding to the volumes of the cells 108. Hermetic seals can be formed at the interfaces between the elastic skin 104 and the channels 120 to substantially prevent leakage of fluid 110 from the cells or fluid migration between the cells 108. In some examples, the hermetic seals can be formed by disposing a sealing material having sealing and bonding properties (e.g., epoxy resin) between the elastic skin 104 and the walls of the channels 120.

Figure 6A:
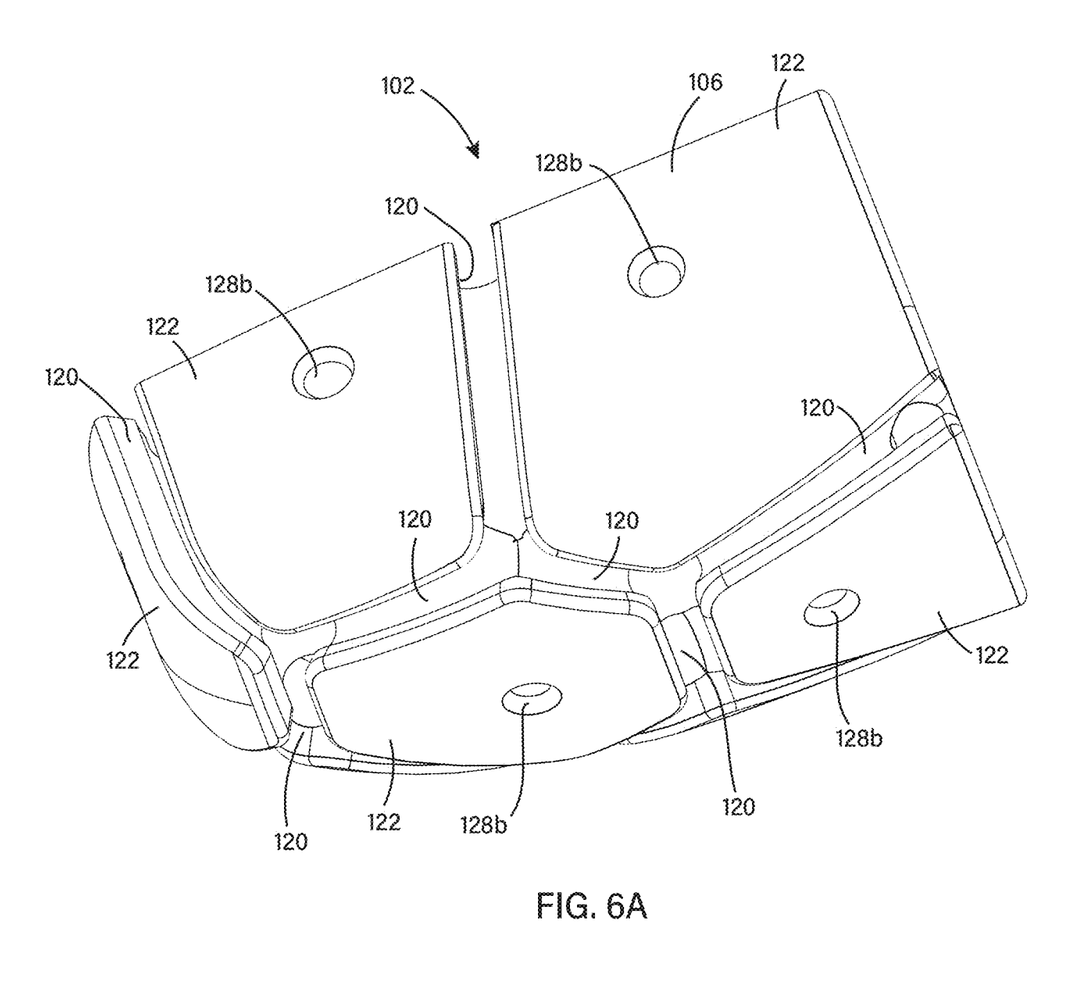
FIG. 6A is a rotated perspective view of the core shown in FIG. 5.
Figure 6B:
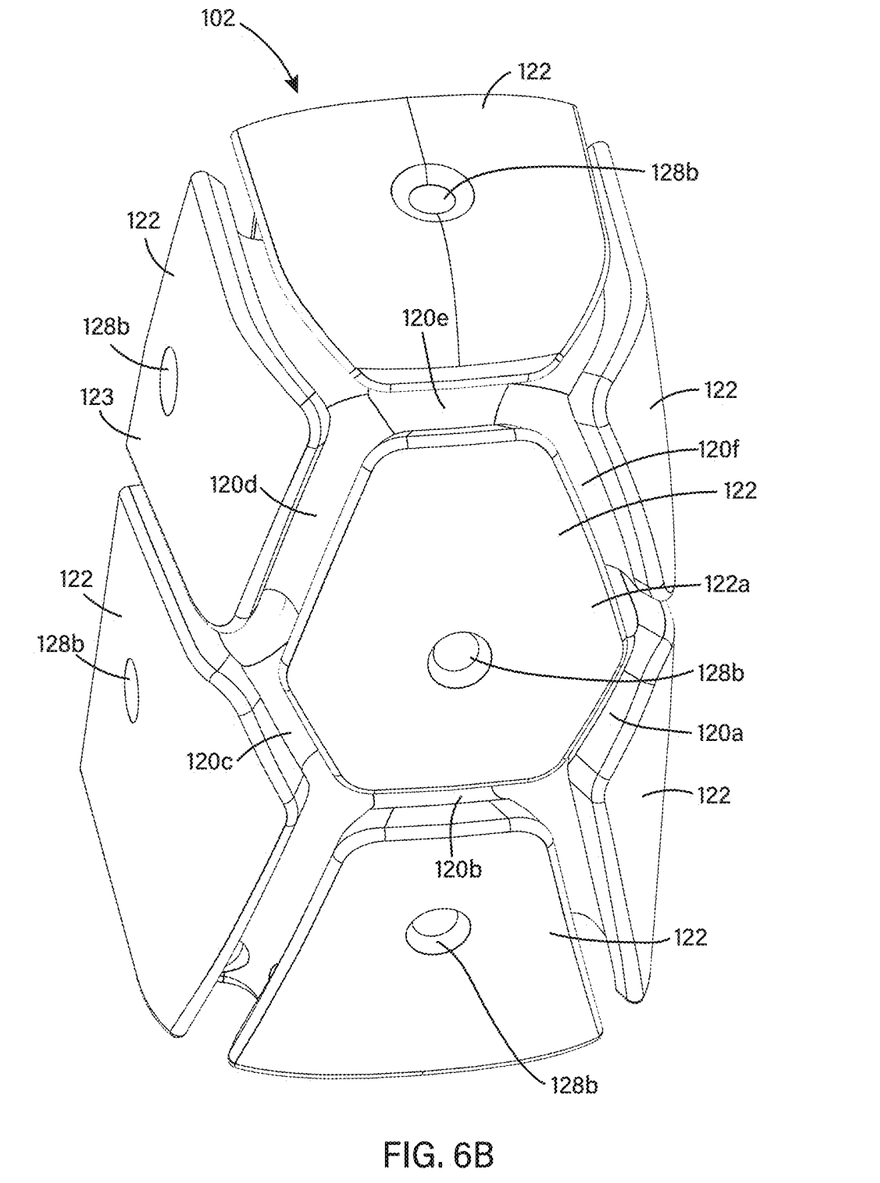
FIG. 6B is another rotated perspective view of the core shown in FIG. 5.

In some examples, as shown in FIGS. 5-6B, the network of interconnected channels 120 segments the outer core portion 106 into multiple facets 122. In the illustrated example, the outer core portion 106 includes seven facets 122. In other examples, the outer core portion 106 can have fewer or greater than seven facets 122. In general, the number of facets 122 can correspond to the number of cells 108. In the illustrated example, the facets 122 have polygonal shapes. In other examples, one or more of the facets 122 can have non-polygonal shapes (e.g., circular or oval shapes). In the illustrated example, the facets 122 are arranged in a honeycomb pattern (see FIG. 6B). In other examples, the facets 122 can be arranged in a different pattern (e.g., a regular grid). The outward facing surfaces 123 of the facets 122 can be flat or curved outwardly. The surface areas of these outwardly facing surfaces 123 can be different across the facets, as illustrated, or can be the same across the facets.

The perimeter of each facet 122 is surrounded by a subnetwork of the channels 120. For example, a given facet 122a in FIG. 6B is surrounded by channels 120a-f. When a portion 124b of the elastic skin 104 extends into the subnetwork of channels, an enclosed volume is formed between the given facet 122a and the elastic skin 104, as shown in FIG. 4. Each enclosed volume formed at each facet 122 corresponds to a cell 108. In some examples, as illustrated in FIG. 3, each given cell 108a can have a first boundary formed by a given facet 122a, a second boundary formed by a first skin portion 124a of the elastic skin 104 in opposing relation to the given facet 122a, and a third boundary formed by a second skin portion 124b of the elastic skin 104 extending into the subnetwork of channels 120 surrounding the given facet 122a. Adjacent cells 108 have a common channel 120 between them. As a result, adjacent cells 108 share the third boundaries formed by extension of the second skin portions 124b of the elastic skin 104 into the channels 120.

In some examples, as shown in FIGS. 5-7B, the core 102 can include a chamber 126 formed in the inner core portion 114. Pockets 130 can be formed in the inner core portion 114 and disposed at spaced locations along a wall of the chamber 126. The core 102 can include channels 128 extending from the pockets 130 to the outer core portion 106. The channels 128 can have first openings 128a connected to the pockets 130 and second openings 128b on the facets 122.

Each cell 108 having a facet 122 as a boundary is connected to a corresponding channel 128 via the second opening 128b of the channel on the facet. As shown in FIG. 3, the fluid in the cell 108 extends into the channel 128 to form a column of fluid in the channel 128. In some examples, the pressure transducers 112 are recessed from the cells 108. For example, the pressure transducers 112 are disposed in the pockets 130 formed in the inner core portion 114. In some examples, the pressure transducers 112 are exposed to the columns of fluid in the corresponding channels 128 via the first openings 128a that are connected to the pockets 130. Since the column of fluid in a given channel 128 is connected to the fluid 110 in the corresponding cell 108, the pressure transducer 112 exposed to the column of fluid in the given channel 128 can measure fluid pressure changes in the corresponding cell 108.

In some examples, as shown in FIG. 3, a flexible circuit board 132 can be disposed within the chamber 126. The flexible circuit board 132 can have a shape that conforms to an inner wall 127 of the chamber 126 such that portions of the flexible circuit board 132 extend over and cover the pockets 130. In some examples, the pressure transducers 112 can be attached to the portions of the flexible circuit board 132 extending over the pockets 130 such that the pressure transducers 112 are positioned in the pockets 130 by conforming the flexible circuit board 132 to the inner wall 127 of the chamber 126.

The flexible circuit board 132 can communicate with the pressure transducers 112 (e.g., provide power to one or more sensors in the pressure transducers and receive signals from the sensors). An end portion 132a of the flexible circuit board 132 can extend outside of the chamber 126 for connection to an external circuit. In some examples, the pressure transducer 112 can be a barometric pressure transducer. In some examples, the pressure transducer 112 can include a strain gauge attached to a flexible membrane or diaphragm. The pressure transducer 112 can be mounted in the pocket 130 such that the fluid 110 in a corresponding cell 108 can exert pressure on the membrane through the corresponding channel 128. Fluid pressure on the membrane deforms the strain gauge, causing a change in the resistance of the strain gauge, which is converted to an output signal corresponding to a pressure measurement. In some examples, the pressure transducer 112 can include a temperature sensor disposed on the strain gauge. The temperature readings can be used in interpreting the output of the strain gauge.

Figure 7A:
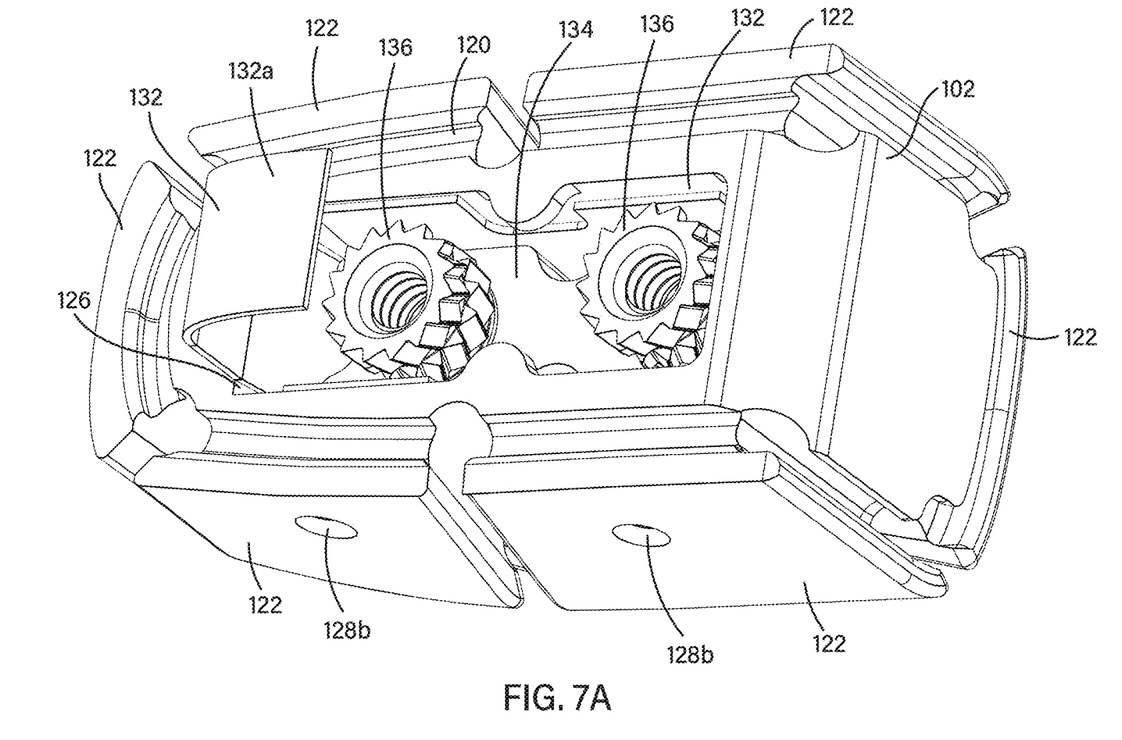
FIG. 7A is a perspective view of the fluidic tactile sensor shown in FIG. 1 without the elastic skin.
Figure 7B:
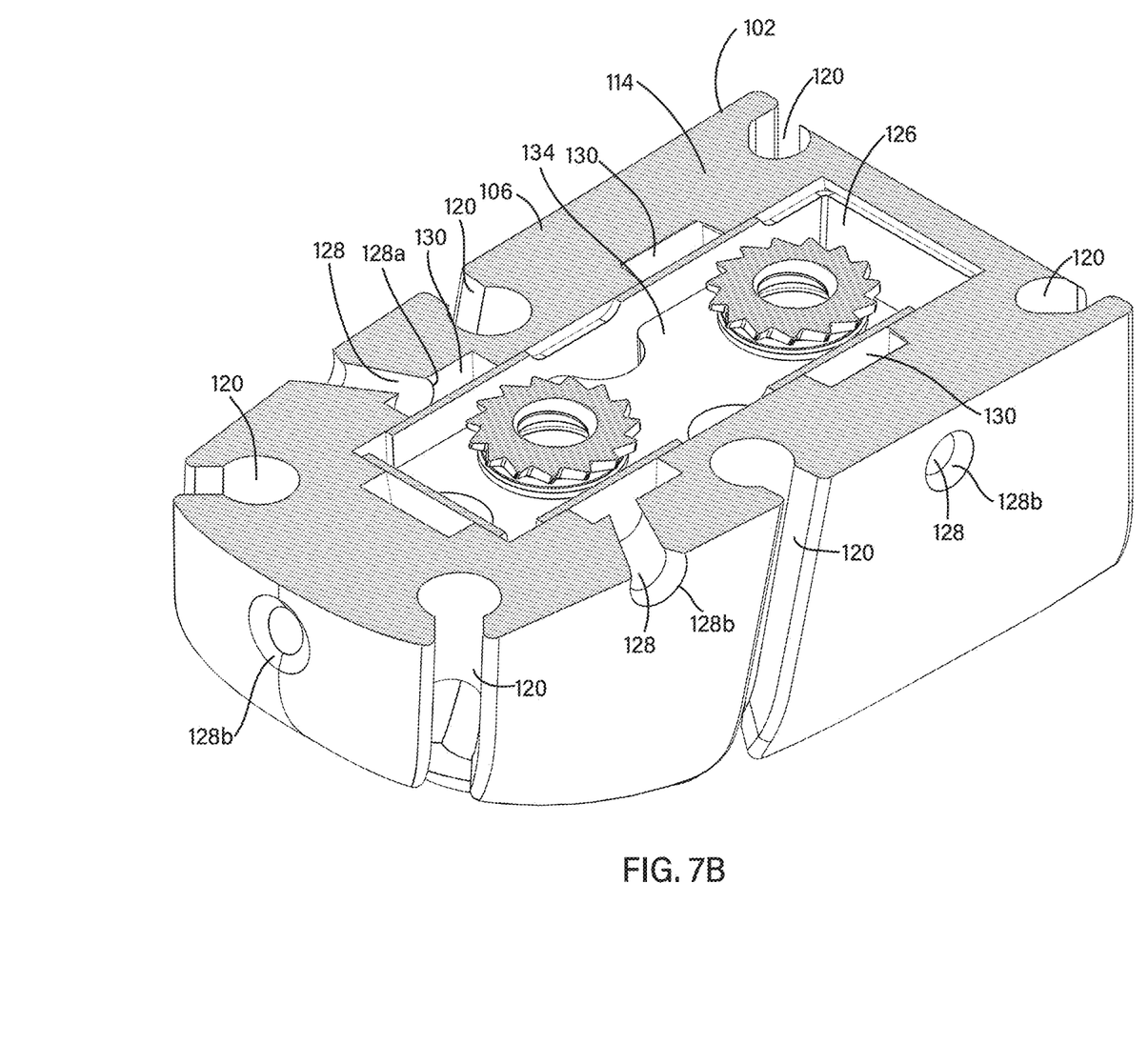
FIG. 7B is a cross-sectional view of the fluidic tactile sensor shown in FIG. 1 without the elastic skin.

In some examples, a core insert 134 can be disposed within the chamber 126, as shown in FIG. 7A. In the illustrated example, the core insert 134 is nested within a volume formed by the portion of the flexible circuit board 132 within the chamber 126. The core insert 134 can conform to the inner surface of the flexible circuit board 132 such that the flexible circuit board 132 is pinned between the core insert 134 and the inner wall 127 of the chamber 126 (see FIG. 3). The core insert 134 can include mounting portions 136 that can engage fasteners. For example, the mounting portions 136 can be nuts with internally threaded bores 136a that can receive and engage threaded bolts. The mounting portions 136 can be used to attach the fluidic tactile sensor 100 to a surface of interest.

In some examples, the chamber 126 can be hermetically sealed to prevent fluid leakage from the cells 108 via the channels 128 and chamber 126. In one example, the hermetical sealing can include filling voids in the chamber 126 not occupied by sensor structures (such as the core insert 134 and the flexible circuit board 132) with a hermetic sealing material (e.g., epoxy resin).

In some examples, the core insert 134 can include or have channels that communicate with a manifold having one or more valves that allow fluid to be injected into the cells 108 (e.g., when the fluid pressure in the cells 108 drops below a reference pressure).

When a contact force is applied to the elastic skin 104 so as to deform the elastic skin 104, a change in fluid pressure is produced inside a given cell 108 corresponding to the region in which the contact force is applied. The change in pressure in the given cell 108 may be transmitted to one or more adjacent cells 108 through the shared cell boundaries. The pressure transducers 112 can measure fluid pressure inside the cells 108. The outputs of the pressure transducers 112 can be used to determine where the contact with the elastic skin 104 is occurring and how much contact force is being applied. For example, during calibration of the fluidic tactile sensor 100, a range of pressures can be applied to the fluidic tactile sensor at different positions on the elastic skin 104 and at different angles. The outputs of the pressure transducers 112 can be recorded. A model of the fluidic tactile sensor response to applied contact force can be developed and subsequently used to characterize tactile sensing with the fluidic tactile sensor.

Example III—Robot Digit with Compliant Tactile Sensor

Figure 8:
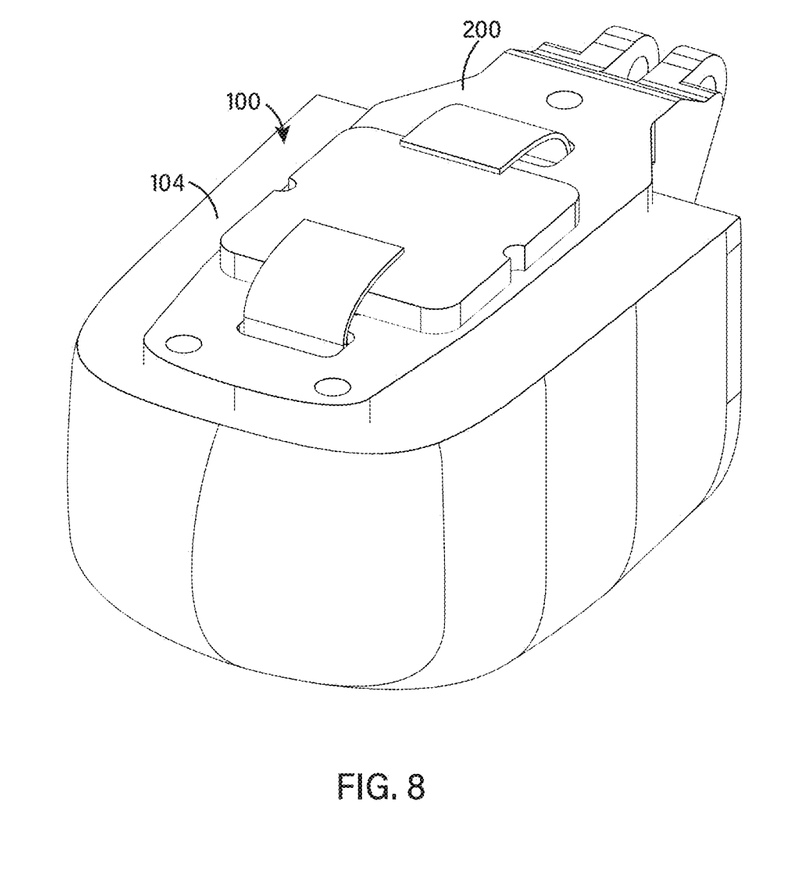
FIG. 8 is a perspective view of an assembly of the fluidic tactile sensor shown in FIG. 1 and a distal phalanx of a robotic digit.
Figure 9:
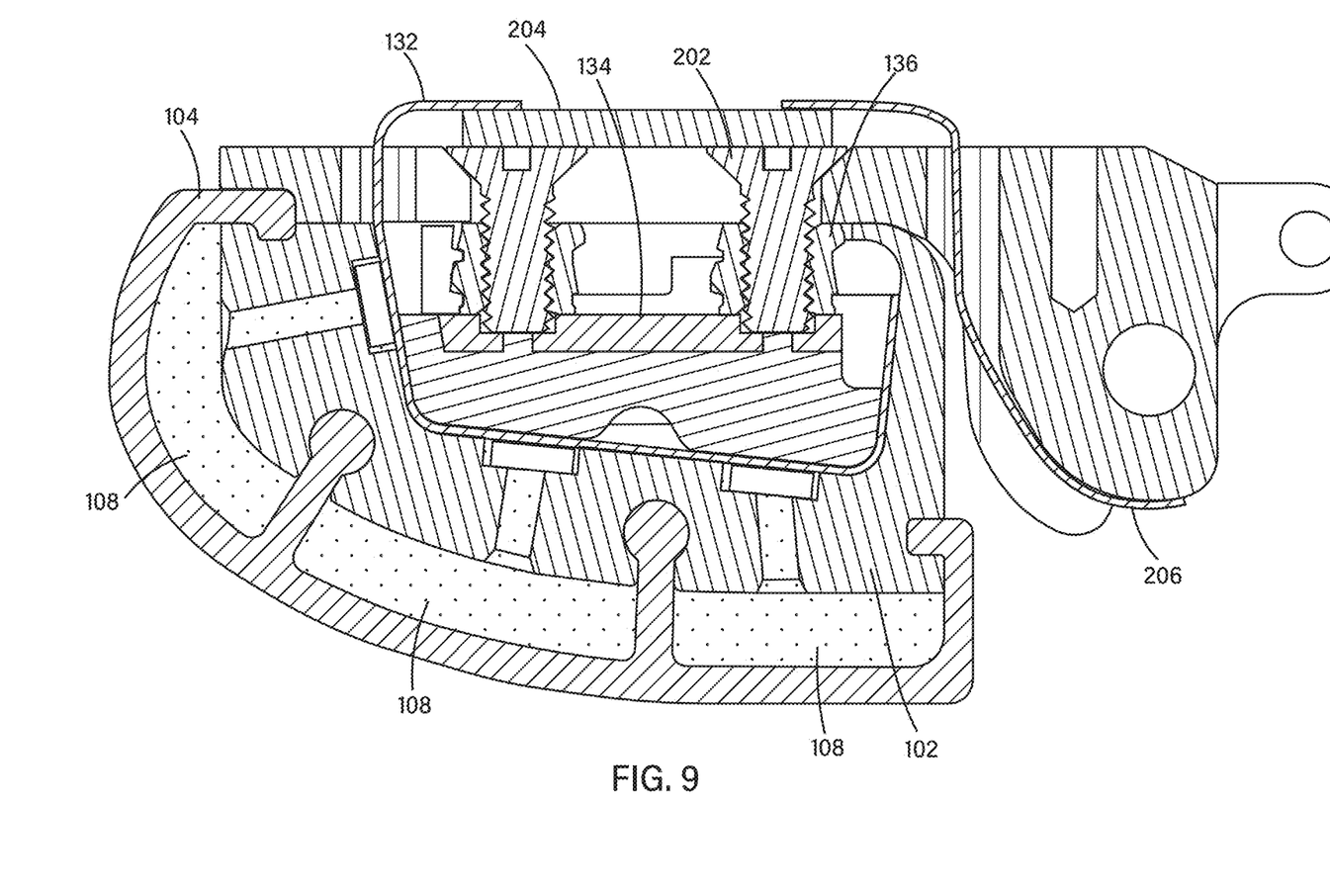
FIG. 9 is a cross-sectional view of the assembly shown in FIG. 8.

FIGS. 8-9 illustrate the fluidic tactile sensor 100 fastened to an inner surface of a distal phalanx 200 of a robotic digit (e.g., by threaded fasteners 202 engaging the mounting portions 136 of the core insert 134). The flexible circuit board 132 can be connected to a junction board 204 mounted on the distal phalanx 200. Another flexible circuit board 206 can connect the junction board 204 to a printed circuit board (not shown) on the robotic digit or robotic hand.

Figure 10:
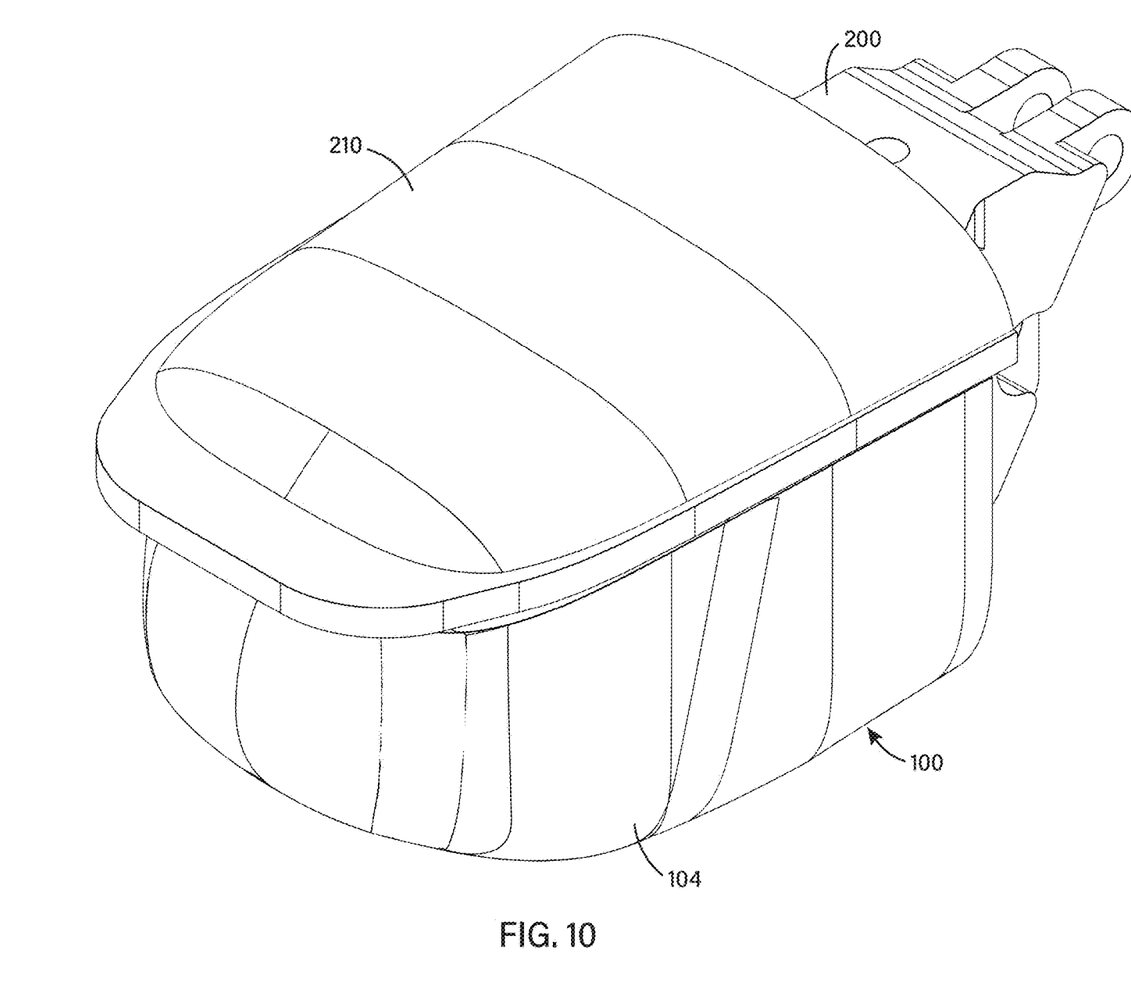
FIG. 10 is a perspective view of the assembly shown in FIG. 8 with a cover.

FIG. 10 shows a cover 210 mounted on the outer surface of the distal phalanx 200. The cover 210 extends over the junction board 204 and a portion of the elastic skin 104 extending laterally to a perimeter of the distal phalanx 200. The cover 210 can provide a hermetic seal for the fluidic tactile sensor and function as a fingernail for the distal phalanx 200.

Additional Examples

Additional examples based on principles described herein are enumerated below. Further examples falling within the scope of the subject matter can be configured by, for example, taking one feature of an example in isolation, taking more than one feature of an example in combination, or combining one or more features of one example with one or more features of one or more other examples.

Example 1: A tactile sensor comprising: a core comprising an outer core portion, an inner core portion, and a first channel having a first opening at a first surface portion of the outer core portion; an elastic skin disposed over the first surface portion; and a cell formed between the first surface portion and the elastic skin and fluidly connected to the first channel, the cell containing a fluid, wherein a contact force applied to the elastic skin produces a measurable change in fluid pressure inside the cell.

Example 2: The tactile sensor of Example 1, wherein the cell comprises a first cell boundary formed by the first surface portion and a second cell boundary formed by a first skin portion of the elastic skin in opposing relation to the first surface portion.

Example 3: The tactile sensor of any one of Example 1-2, further comprising a pressure transducer arranged to measure fluid pressure in the cell.

Example 4: The tactile sensor of Example 3, wherein the pressure transducer is a membrane based pressure transducer.

Example 5: The tactile sensor of any one of Examples 3-4, wherein the pressure transducer is disposed in a pocket formed within the inner core portion and is exposed to the fluid pressure via the first channel.

Example 6: The tactile sensor of Example 5, further comprising a flexible circuit board disposed in a chamber formed within the inner core portion, wherein the pressure transducer is coupled to a portion of the flexible circuit board extending over the pocket.

Example 7: The tactile sensor of any one of Example 1-6, wherein the fluid is a gas.

Example 8: The tactile sensor of Example 7, wherein the gas is ambient air.

Example 9: The tactile sensor of any one of Examples 1-6, wherein the fluid is a liquid.

Example 10: The tactile sensor of Example 9, wherein the liquid is a lubricant.

Example 11: The tactile sensor of any one of Examples 1-10, wherein the fluid is a biphasic fluid.

Example 12: The tactile sensor of any one of Examples 1-11, wherein the elastic skin is impermeable to the fluid.

Example 13: The tactile sensor of any one of Examples 1-12, wherein the elastic skin comprises an elastomer.

Example 14: The tactile sensor of any one of Examples 1-13, wherein the cell is hermetically sealed.

Example 15: The tactile sensor of any one of Examples 1-15, wherein the elastic skin is mechanically coupled to the core.

Example 16: The tactile sensor of Example 15, wherein the outer core portion comprises one or more second channels, wherein an edge portion of the elastic skin extends into and sealingly engages the one or more second channels.

Example 17: The tactile sensor of any one of Examples 1-16, wherein the core is nonplanar.

Example 18: The tactile sensor of any one of Examples 1-17, wherein the first surface portion comprises a curved surface.

Example 19: A tactile sensor comprising: a core comprising an outer core portion, an inner core portion, and a plurality of first channels having first openings at a plurality of first surface portions of the outer core portion; an elastic skin disposed over the first surface portions; and a plurality of cells formed between the first surface portions and the elastic skin, each of the cells containing a fluid, wherein a contact force applied to the elastic skin at a first location corresponding to one of the cells produces a measurable change in fluid pressure inside the one of the cells.

Example 20: The tactile sensor of Example 19, further comprising a plurality of pressure transducers arranged to measure fluid pressure in the cells.

Example 21: The tactile sensor of Example 20, wherein the pressure transducers are barometric pressure transducers.

Example 22: The tactile sensor of any one of Example s 20-21, wherein the pressure transducers are disposed in pockets formed at spaced locations within the inner core portion and are exposed to the fluid pressure in the cells via the first channels.

Example 23: The tactile sensor of Example 22, further comprising a flexible circuit board disposed in a chamber formed within the inner core portion, wherein the pressure transducers are coupled to portions of the flexible circuit board extending over the pockets.

Example 24: The tactile sensor of any one of Examples 19-23, wherein the outer core portion comprises a network of second channels, and wherein portions of the elastic skin extend into and sealingly engage the network of second channels.

Example 25: The tactile sensor of Example 24, wherein the portions of the elastic skin form shared boundaries between the plurality of cells, and wherein the contact force applied at the first location corresponding to the one of the cells produces a measurable change in fluid pressure in at least another one of the cells adjacent to the one of the cells.

Example 26: The tactile sensor of Example 25, wherein the network of second channels form a plurality of facets in the outer core portion, and wherein each facet provides one of the first surface portions.

Example 27: The tactile sensor of Example 26, wherein the facets are arranged in a honeycomb pattern.

Example 28: The tactile sensor of any one of Examples 19-27, wherein the elastic skin is mechanically coupled to the core.

Example 29: The tactile sensor of any one of Examples 19-28, wherein the cells are hermetically sealed.

Example 30: The tactile sensor of any one of Examples 19-29, wherein an edge portion of the elastic skin sealingly engages the outer core portion.

Example 31: The tactile sensor of any one of Examples 19-30, wherein the first surface portions comprise curved surfaces.

Example 32: The tactile sensor of any one of Examples 19-31, wherein the core is nonplanar.

Example 33: The tactile sensor of any one of Examples 19-32, wherein the core comprises at least one port communicatively coupled to the plurality of channels, and further comprising a valve arranged in the at least one port.

Example 34: The tactile sensor of any one of Examples 19-33, wherein the elastic skin comprises an elastomer.

Example 35: The tactile sensor of any one of Examples 19-33, wherein the fluid is a gas or a liquid.

Example 36: The tactile sensor of Example 35, wherein the fluid is ambient air.

Example 37: The tactile sensor of Example 35, wherein the fluid is a lubricant.

Example 38: The tactile sensor of Example 35, wherein the fluid is compressed.

Example 39: The tactile sensor of any one of Examples 19-33, wherein the fluid a biphasic fluid.

Example 40: The tactile sensor of any one of Examples 19-39, wherein the elastic skin is impermeable to the fluid.

The invention claimed is:

1. A fluidic tactile sensor comprising:
a core comprising an outer core portion, an inner core portion, and a plurality of first channels having first openings at a plurality of first surface portions of the outer core portion, wherein the outer core portion comprises a network of second channels;
an elastic skin disposed over the first surface portions, wherein portions of the elastic skin extend into and sealingly engage the network of second channels;
a plurality of cells formed between the first surface portions and the elastic skin and fluidly connected to the plurality of first channels, each of the cells containing a fluid, wherein a contact force applied to the elastic skin at a first location corresponding to one of the cells produces a measurable change in fluid pressure inside the one of the cells: and
a plurality of pressure transducers arranged to measure fluid pressure in the cells.

2. The fluidic tactile sensor of claim 1, wherein the fluid is a gas or a liquid.

3. The fluidic tactile sensor of claim 1, wherein the pressure transducers are barometric pressure transducers.

4. The fluidic tactile sensor of claim 1, wherein the pressure transducers are disposed in pockets formed at spaced locations within the inner core portion and are exposed to the fluid pressure in the cells via the first channels.

5. The fluidic tactile sensor of claim 4, further comprising a flexible circuit board disposed in a chamber formed within the inner core portion, wherein the pressure transducers are coupled to portions of the flexible circuit board extending over the pockets.

6. The fluidic tactile sensor of claim 1, wherein the elastic skin is impermeable to the fluid.

7. The fluidic tactile sensor of claim 1, wherein the portions of the elastic skin form shared boundaries between the plurality of cells, and wherein the contact force applied at the first location corresponding to the one of the cells produces a measurable change in fluid pressure in at least another one of the cells adjacent to the one of the cells.

8. The fluidic tactile sensor of claim 7, wherein the network of second channels form a plurality of facets in the outer core portion, and wherein each facet provides one of the first surface portions.

9. The fluidic tactile sensor of claim 8, wherein the facets are arranged in a honeycomb pattern.

10. The fluidic tactile sensor of claim 1, wherein the elastic skin is mechanically coupled to the core.

11. The fluidic tactile sensor of claim 1, wherein the cells are hermetically sealed.

12. The fluidic tactile sensor of claim 1, wherein an edge portion of the elastic skin sealingly engages the outer core portion.

13. The fluidic tactile sensor of claim 1, wherein the first surface portions comprise curved surfaces.

14. The fluidic tactile sensor of claim 1, wherein the core is nonplanar.

15. A fluidic tactile sensor comprising:
a core comprising an outer core portion, an inner core portion, and a plurality of first channels having first openings at a plurality of first surface portions of the outer core portion:
an elastic skin disposed over the first surface portions:
a plurality of cells formed between the first surface portions and the elastic skin and fluidly connected to the plurality of first channels, each of the cells containing a fluid, wherein a contact force applied to the elastic skin at a first location corresponding to one of the cells produces a measurable change in fluid pressure inside the one of the cells: and
a plurality of pressure transducers arranged to measure fluid pressure in the cells:
wherein the core comprises at least one port communicatively coupled to the plurality of first channels, and further comprising a valve arranged in the at least one port.

16. The fluidic tactile sensor of claim 1, wherein the elastic skin comprises an elastomer.

17. The fluidic tactile sensor of claim 2, wherein the fluid is compressed.

18. The fluidic tactile sensor of claim 2, wherein the fluid is ambient air.

* * * * *